June 24, 1930.

E. S. PEARCE

WASTE RECLAMATION SYSTEM

Re. 17,710

Original Filed Dec. 3, 1925

2 Sheets-Sheet 1

Inventor

Edwin S. Pearce

By Brockett & Hyde

Attorneys

June 24, 1930.

E. S. PEARCE

WASTE RECLAMATION SYSTEM

Re. 17,710

2 Sheets-Sheet 2

Original Filed Dec. 3, 1925

Inventor

Edwin S. Pearce

By Brockett & Hyde

Attorneys

Reissued June 24, 1930

Re. 17,710

UNITED STATES PATENT OFFICE

EDWIN S. PEARCE, OF INDIANAPOLIS, INDIANA, ASSIGNOR TO THE AMERICAN LAUNDRY MACHINERY COMPANY, OF NORWOOD, OHIO, A CORPORATION OF OHIO

WASTE-RECLAMATION SYSTEM

Original No. 1,713,711, dated May 21, 1929, Serial No. 72,977, filed December 3, 1925. Application for reissue filed December 30, 1929. Serial No. 417,577.

This invention relates to apparatus for reclaiming or renovating journal box waste, its object being to provide an improved system of efficient and well balanced, conjointly operating apparatus for effectively cleaning old waste, both mechanically and by separation of its oil content, reimpregnating the cleaned waste with fresh oil and reclaiming the old or used oil for further use, all in a manner to conserve heat and reduce the final cost of the product.

Figure 1:
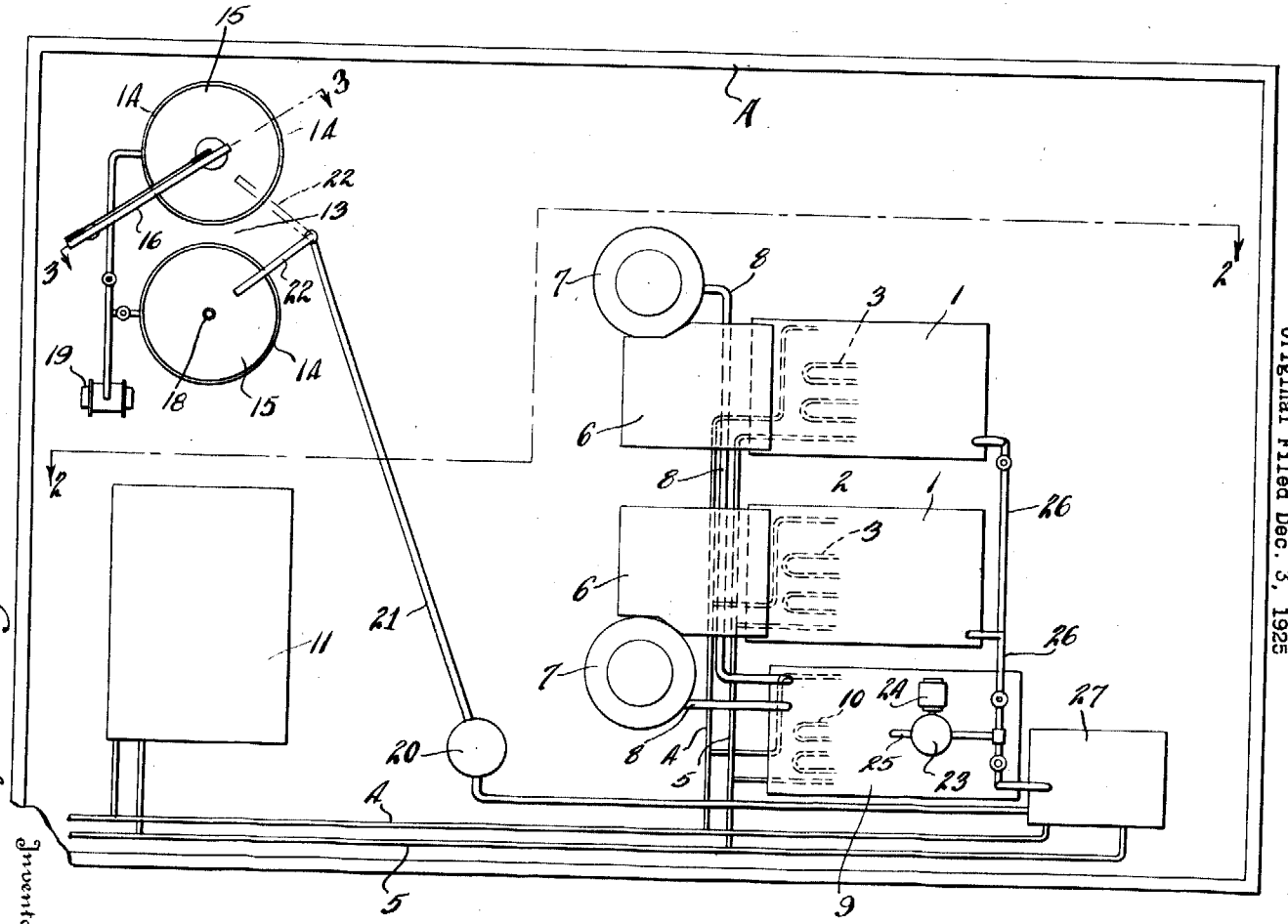
Figures 2, 3:
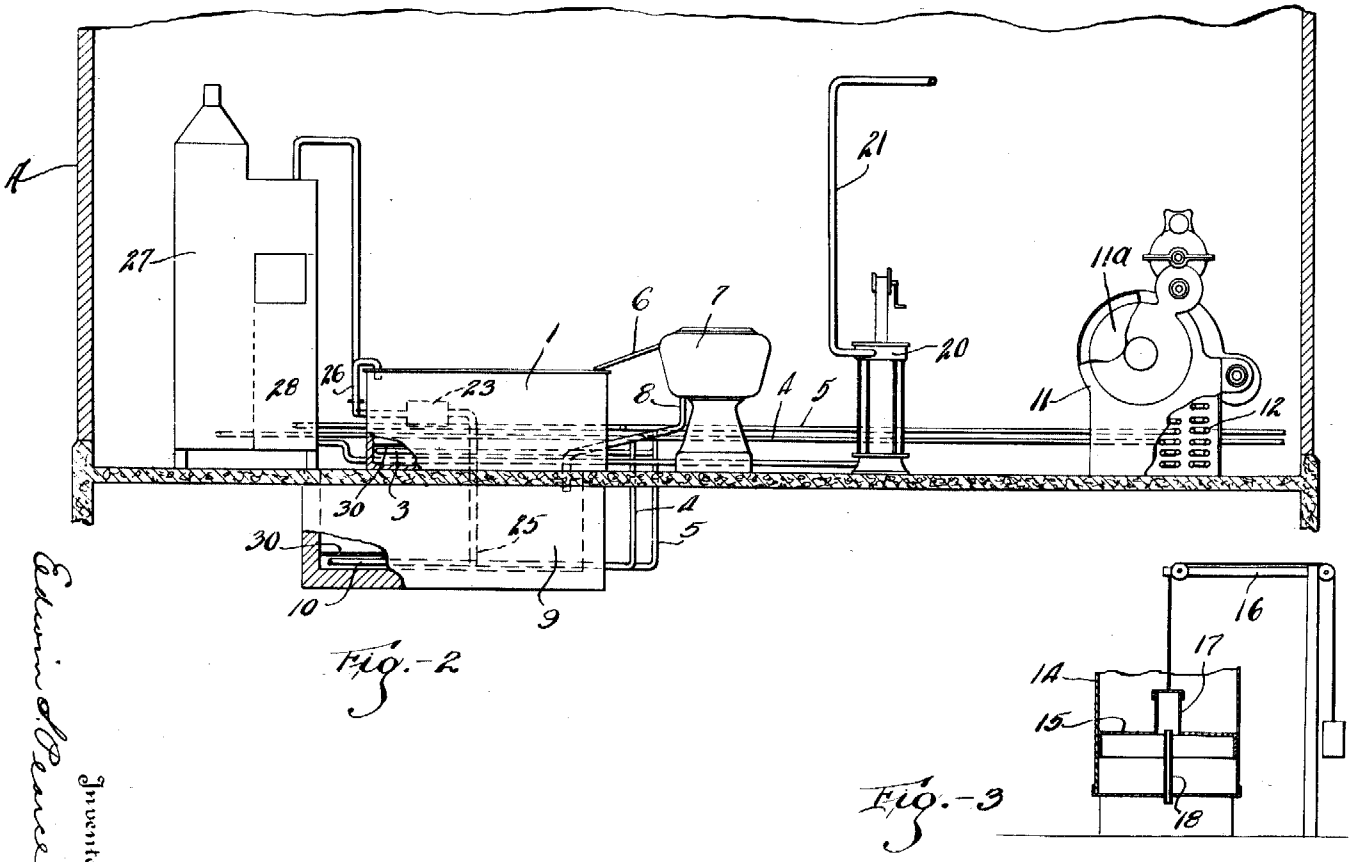

In the drawings, Fig. 1 represents diagrammatically a plan view of a system of apparatus embodying the invention; Fig. 2 is a sectional elevation thereof on the line 2—2, Fig. 1; and Fig. 3 is a detail sectional elevation on the line 3—3, Fig. 1.

The journal box waste to be reclaimed is collected or received in suitable containers, such as metal drums, which are brought to the building marked generally A containing the reclamation plant or system to be described. This waste is received in various conditions, containing various amounts of oil, short or coarse fibres and foreign matter. To bring it to nearly uniform condition and open up its texture and fibre, it is first soaked or immersed in a hot oil bath, for which purpose I provide a plurality, two being shown, of hot oil tanks 1, which are arranged adjacent in parallel relation to each other with an aisle 2 between them, and which tanks may be of metal, concrete or other material and are shown as extending above the floor level. In said tanks are steam heating pipes or coils 3 connected to supply and return lines 4, 5 and at one end of each tank is a drain board 6. Two tanks are provided because their dimensions can be made such as to accommodate a reasonable mass of waste, capable of being conveniently poled or forked around by the workmen so as to open up the waste and secure full flow of oil to all of its fibres. In said tanks some of the heavier foreign matter and large coarse fibres or masses collect at the bottom and may be removed with the sludge by periodical tank cleaning.

When the mass has soaked for a sufficient length of time a quantity is poled or forked out and is piled upon either drain board 6 from which excess or free oil drains back into the tank 1.

Adjacent each drain board is a suitable centrifugal extractor 7, comprising a stationary outer curb or casing in which rotates a foraminous basket or container for the waste, the centrifugal effect at high speed causing the oil to be thrown out from the basket and to be collected in the curb, from which it is conducted by drain pipes 8 to a sump or pit 9, preferably below the floor level, and which serves as a reservoir for the old oil. Said sump is heated by the steam pipes or coils 10 that also connect to supply and return lines 4 and 5. In the extractors 7 the oil content of the waste is reduced to a small amount, something less than the amount required for fresh oiled waste ready for journal box use, so that it is necessary to later add a proper quantity of clean oil to bring the oil content up to the required amount. More important, however, the oil content at the conclusion of the extracting period has always been reduced to a definite or uniform standard amount, so that all extracted waste can be treated alike in later stages with assurance of a standard product.

The next step in the process is that of mechanical cleaning, to wit, the fluffing up of the waste to open its texture and fibres and the removal of short or coarse fibres and foreign matter. This is performed in a drying tumbler indicated conventionally at 11 and comprising an outer casing in which is mounted a rotatable perforated baffled or ribbed drum 11[a] for containing the waste, and through which drum air may be circulated by a fan or any other suitable means, which air is heated by the steam pipes or coils 12 connected to the supply and discharge mains 4, 5. As the mass of extracted waste is turned over and over in this drum, the short and coarse fibres and foreign matter, such as dirt and metal chips, pass through the openings of the drum and are collected and thereby separated, while the usuable fibres are opened up and knotted masses of fibres are separated.

Experience has shown that a standard drying tumbler, such as can be obtained in the open market, will satisfactorily handle the output of two ordinary extractors, which is one of the chief reasons for using two tanks 1 and extractors 7 with a single drying tumbler. Such an arrangement keeps all machines busy and requires the minimum number of laborers.

The product of the mechanical cleaner 11 is clean fluffed waste with a known small quantity of oil therein less than that required for usuable lubricating waste. It remains to bring the oil content up to standard. This is accomplished with a suitable impregnator in which a given quantity of waste is impregnated with a definite quantity of clean oil. Such an impregnator is indicated conventionally at 13 and may be of the general type shown in my prior patent for Methods of and apparatus for impregnating waste fibrous materials with liquids, granted August 6, 1929, No. 1,723,747 to which reference may be had if necessary. The impregnator conventionally shown comprises two like tanks 14 with both of which cooperates an inverted piston like cover 15 movable by the swinging arm 16 into position over either tank. The cover has an upwardly projecting tubular portion 17 closed at its upper end and adapted when the cover slides down in the tank to sleeve over an upwardly projecting suction pipe 18, one in each tank, connected to a source 19 of suction or vacuum. In one of the empty tanks 14 is placed a proper quantity of the cleaned substantially oil-free waste, the quantity being determined by suitable measurement or weight. By a measuring pump 20, hand operated if desired, a proper measured quantity of clean oil is conducted through the discharge pipe 21 and through its swinging end 22 or a hose is fed into the tank. The cover is then applied and by exhausting the air through pipe 18 by means of the suction or vacuum source 19, said cover is moved down until it compresses the waste. Further suction effect removes practically all air and causes the oil to fully penetrate even the finest interstices or spaces in or between the fibres. In a short time the impregnation step is completed and the finished product may be withdrawn and packed for shipment. The clean oil charge is, of course, accurately measured so that each pound of the final waste will contain a predetermined standard amount of oil. Two impregnating tanks are used so that while impregnation is going on in one tank the other tank may be emptied and filled with a fresh charge of waste to be impregnated, thus keeping all apparatus busy with the minimum number of operators.

To supply oil as needed to the soaking tanks 1, I have provided a suitable pump 23 shown as driven by a suitable motor 24, either steam or electric, said pump having its inlet pipe 25 extending to a low level in the sump and its discharge pipe 26 provided with branches, one for each tank. Said pump also has its discharge pipe connected to supply old oil to the renovator 27 which may be of any desired form adapted to separate solid and liquid impurities from the oil and conserve the useful lubricant for further use. Such renovator, for example, may be of the form shown in my prior patent for Apparatus for and method of treating oil, granted January 8, 1929, No. 1,698,273 to which reference may be had if necessary. Any renovator, of course, would include in the system some storage tank, such as indicated at 28, for containing or holding the renovated oil, and would be connected to the steam lines 4, 5 for supplying steam for heating the oil, if necessary, and for maintaining the oil supply hot. The clean oil tank 28 is connected to the hand pump 20 which supplies oil to the impregnator.

With this system, all parts of the apparatus are properly balanced and related to each other, both in size or capacity and in location. The waste progresses through the system by the shortest paths and with the least possible handling. Heat is always conserved by the storage supplies both of old and cleaned oil, because when the entire system is in operation the regular travel of the oil from the tanks 1 to the extractors, thence to the sump, thence to either the tanks 1 or to the renovator 27, and from the latter directly to the impregnator is such that only a small amount of the original heat is wasted by radiation. Other advantages will appear to those skilled in the art.

Sediment may gather in both tanks 1 and sump 9, and in order to keep sediment from accumulating on the heating pipes 3 and 10 respectively at the bottom of these tanks, I have provided protecting screens 30.

What I claim is:

1. Apparatus for reclaiming used journal box waste, comprising a soaking tank for the waste to be reclaimed, means for removing the major part of the oil of the waste from the fibrous part thereof, an old oil storage tank arranged at a lower level than said soaking tank and said oil removing means and connected to said oil removing means for receiving therefrom by drainage the oil removed from said waste and having a connection to said soaking tank for supplying oil thereto for soaking purposes, a mechanical device for cleaning the fibrous waste part after removal of oil therefrom, an impregnator for impregnating with oil said fibrous waste part, and means for supplying oil to said impregnator for impregnation purposes.

2. Apparatus for reclaiming used journal box waste, comprising a soaking tank for the waste to be reclaimed, means for removing the major part of the oil of the waste from the fibrous part thereof, an old oil storage tank arranged at a lower level than said soaking tank and said oil removing means and connected to said oil removing means for receiving therefrom by drainage the oil removed from said waste and having a connection to said soaking tank for supplying oil thereto for soaking purposes, a mechanical device for cleaning the fibrous waste part after removal of oil therefrom, an impregnator for impregnating with oil said fibrous waster part, a heated renovator connected to said storage tank for receiving therefrom oil removed from the fibrous waste part, and conduit means leading from said renovator to said impregnator for supplying renovated oil to said impregnator.

3. Apparatus for reclaiming used journal box waste, comprising a soaking tank for the waste to be reclaimed, means for removing the major part of the oil of the waste from the fibrous part thereof, an old oil storage tank arranged at a lower level than said soaking tank and said oil removing means and connected to said oil removing means for receiving therefrom by drainage the oil removed from said waste and having a connection to said soaking tank for supplying oil thereto for soaking purposes, a mechanical device for cleaning the fibrous waste part after removal of oil therefrom, an impregnator for impregnating with oil said fibrous waste part, means for supplying oil to said impregnator for impregnation purposes, and heating means for the oil in said soaking tank and said storage tank.

4. Apparatus for reclaiming used journal box waste, comprising a soaking tank for the waste to be reclaimed, means for removing the major part of the oil of the waste from the fibrous part thereof, an old oil storage tank arranged at a lower level than said soaking tank and said oil removing means and connected to said oil removing means for receiving therefrom by drainage the oil removed from said waste and having a connection to said soaking tank for supplying oil thereto for soaking purposes, a mechanical device for cleaning the fibrous waste part after removal of oil therefrom, an impregnator for impregnating with oil said fibrous waste part, a renovator connected to said storage tank for receiving therefrom oil removed from the fibrous waste part, conduit means leading from said renovator to said impregnator for supplying renovated oil to said impregnator, and heating means for the oil in said soaking tank, said storage tank and said renovator.

5. Apparatus for reclaiming used journal box waste, comprising two soaking tanks for the waste to be reclaimed, two extractors, one for each soaking tank, for removing the major part of the oil of the waste from the fibrous part thereof, and a single mechanical cleaner for receiving from both extractors the fibrous part of the waste for mechanically cleaning the same.

6. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, and an impregnator for impregnating with oil the fibrous part of the waste cleaned in said mechanical cleaner.

7. Apparatus for reclaiming used journal box waste, comprising two soaking tanks, for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, and a storage tank connected to both of said extractors for receiving therefrom the oil removed from the waste.

8. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, an impregnator for impregnating with oil the fibrous part of the waste cleaned in said mechanical cleaner, and a storage tank connected to both of said extractors for receiving therefrom the oil removed from the waste.

9. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, and a storage tank connected to both of said extractors for receiving therefrom the oil removed from the waste and having connections to said soaking tanks for supplying oil thereto for the soaking operations.

10. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, an impregnator for impregnating with oil the fibrous part of the waste cleaned in said mechanical cleaner, and a storage tank connected to both of said extractors for receiving therefrom the oil removed from the waste and having connections to said soaking tanks for supplying oil thereto for the soaking operations.

11. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, a storage tank connected to both of said extractors for receiving therefrom the oil removed from the waste, and an oil renovator connected to said storage tank for receiving therefrom the oil removed from the fibrous waste part.

12. Apparatus for reclaiming used journal box waste, comprising two soaking tanks for the waste to be reclaimed, two extractors, one for each soaking tank, for removing the major part of the oil of the waste from the fibrous part thereof, a single mechanical cleaner for receiving from both extractors the fibrous part of the waste for mechanically cleaning the same, an impregnator for impregnating with oil the fibrous part of the waste cleaned in said mechanical cleaner, a storage tank connected to both of said extractors for receiving therefrom the oil removed from the waste, an oil renovator connected to said storage tank for receiving therefrom the oil removed from the waste, an oil renovator connected to said storage tank for receiving therefrom oil removed from the fibrous waste part, and conduit means leading from said renovator to said impregnator for delivering renovated oil from the former to the latter.

13. Apparatus for reclaiming used journal box waste, comprising a soaking tank for the waste, means for receiving from said soaking tank the soaked waste and for effecting the removal of the major part of the oil thereof, and an oil storage tank arranged at a lower level than said soaking tank and said oil removing means and connected to said oil removing means for receiving therefrom by drainage the removed oil, said oil storage tank being also connected to said soaking tank, whereby said soaking tank can be supplied with oil, when needed, from said oil storage tank.

14. Apparatus for reclaiming used journal box waste, comprising a soaking tank for the waste, means for receiving from said soaking tank the soaked waste and for effecting the removal of the major part of the oil thereof, an oil storage tank arranged at a lower level than said soaking tank and said oil removing means and connected to said oil removing means for receiving therefrom by drainage the removed oil, said oil storage tank being also connected to said soaking tank, whereby said soaking tank can be supplied with oil, when needed, from said oil storage tank, and a heated oil renovator connected to said storage tank for receiving therefrom at least a part of the oil removed from the waste by said oil removing means.

15. Apparatus for reclaiming used journal box waste comprising a soaking tank for the waste, an oil storage tank arranged at a lower level than and having communication with said soaking tank, whereby oil can be delivered from said storage tank to said soaking tank, means other than said communication for causing some of the oil removed from said soaking tank to be delivered into said storage tank, and a heated oil renovator having communication with said storage tank, whereby oil can be delivered from said storage tank to said renovator.

16. Apparatus for reclaiming used journal box waste comprising a heated oil soaking tank for waste, a heated oil storage tank arranged at a lower level than and connected to said soaking tank, means other than said connection for causing some of the oil removed from said soaking tank to be delivered into said storage tank, and a heated oil renovator connected to said oil storage tank, whereby oil can be supplied from said storage tank through said connections to both said soaking tank and said oil renovator.

17. Apparatus for reclaiming used journal box waste, comprising a soaking tank for the waste, means for receiving from said soaking tank the soaked waste and for effecting the removal of the major part of the oil thereof, a heated oil renovator, and connections between said oil-removing means and said soaking tank and between said oil-removing means and said renovator, whereby removed oil can be supplied to both said soaking tank and said renovator.

18. Apparatus for reclaiming used journal box waste, comprising a soaking tank for the waste to be reclaimed, means for receiving from said soaking tank the soaked waste and for effecting the removal of the major part of the oil thereof, an oil renovator having oil receiving communication with said removing means and having a heated storage chamber for renovated oil, and an impregnator having oil receiving communication with the storage chamber of said renovator.

In testimony whereof I hereby affix my signature.

EDWIN S. PEARCE.

CERTIFICATE OF CORRECTION.

Reissue Patent No. 17,710. Granted June 24, 1930, to

EDWIN S. PEARCE.

It is hereby certified that error appears in the printed specification of the above numbered patent requiring correction as follows: Page 4, lines 31, 32 and 33, claim 12, strike out "an oil renovator connected to said storage tank for receiving therefrom the oil removed from the waste,"; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.